US006341809B1

(12) United States Patent
Chapman

(10) Patent No.: US 6,341,809 B1
(45) Date of Patent: Jan. 29, 2002

(54) LIFTGATE COUNTERBALANCE SYSTEM

(75) Inventor: David Joseph Chapman, Sterling Heights, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/736,672

(22) Filed: Dec. 13, 2000

(51) Int. Cl.[7] ................................................ B62D 25/08

(52) U.S. Cl. ........................ 296/56; 296/146.8; 49/352; 49/110

(58) Field of Search ......................... 296/50, 56, 146.4, 296/146.8; 49/110, 340, 351, 352

(56) References Cited

U.S. PATENT DOCUMENTS 4,601,446 A * 7/1986 Opsahl .................... 244/129.5
4,765,026 A * 8/1988 Dochnahl .................... 16/289
6,120,080 A * 9/2000 Hori et al. .................... 296/56

* cited by examiner

*Primary Examiner*—Joseph D. Pape
*Assistant Examiner*—Jason Morrow
(74) *Attorney, Agent, or Firm*—Patrick M. Griffin

(57) ABSTRACT

A vehicle liftgate has a counterbalance system comprising a first link pivotally connected to the vehicle body. A second link is pivotally connected to the first link at one end and to the liftgate at the opposite end. The counterbalance system includes a compression spring that is attached to the first link via a pulley. The compression spring stores energy when the liftgate is closed to assist in subsequent opening of the tailgate. The liftgate may be closed manually or with power assistance.

9 Claims, 1 Drawing Sheet

LIFTGATE COUNTERBALANCE SYSTEM

FIELD OF THE INVENTION

This invention relates to vehicles, such as sport utility vehicles, having a liftgate for access to a cargo compartment and more particularly to a counterbalance system for the liftgate.

BACKGROUND OF THE INVENTION

Vehicles that have liftgates usually include a counterbalance system that stores energy when the lift gate is closed with the stored energy then being used to assist in the subsequent lifting of the liftgate to an open position. A common liftgate counterbalance system uses a pair of gas springs that are pivotally attached to opposite sides of the lift gate at one end and to the vehicle body at the opposite end.

A drawback with gas springs is that the gas springs are sensitive to variations in ambient temperature. This results in the use of gas springs that resist closure of the liftgate with considerable force on hot days. For instance, the gas spring or springs must be strong enough to open the liftgate on the coldest day (usually assumed to be −40° C.) Such gas springs increase closing resistance substantially on the hottest day (usually assumed to be 80° C.) Therefore considerable effort must be used to close the liftgate or a very large electric motor used in the case of a power operated system.

Liftgates that have two or more gas springs for a counterbalance system are common. These gas springs generally occupy a position in which their axes is substantially parallel to the liftgate so that the gas springs are hidden when the liftgate is closed. In this closed position the moment arm of the gas springs is quite small. With such systems the liftgate may move about one-third of its total travel range before the ga cylinders exert sufficient force to open the liftgate further without the application of an independent lifting force. There are even some systems in which the gas springs pass over center and bias a liftgate toward a closed position when the liftgate is closed. With these self-closing systems a liftgate may need to be more than one-third open before the gas springs will open the liftgate further. Thus the geometry of the gas spring counterbalance system itself increases the drawback of gas spring counterbalance system.

Decklids have been counterbalanced with steel coil springs for many years. A decklid when open, with spring relaxed has the gravity moment at its minimum. As the decklid is closed the gravity moment and the spring output both increase. With spring and gravity moment tracking together, counterbalancing a decklid is straightforward. The difficulty with counterbalancing a liftgate, in comparison to a decklid is that with the liftgate in the open position, and the counterbalance spring relaxed, the gravity moment is near its maximum. This means that when the spring is at its minimum output the load from the liftgate is maximum. The converse is also true. When the spring is at a maximum output the liftgate has its smallest gravity moment. Thus coil spring counterbalance systems for decklids are not well suited for liftgates.

SUMMARY OF THE INVENTION

The counterbalance system of this invention uses a compression spring or springs as an alternate for gas springs in a liftgate application and thus provides a liftgate counterbalance system that is not sensitive to variations in ambient temperature. The counterbalance system of the invention also has an improved geometry and changing mechanical advantage for applying the compression spring forces of the counterbalance system to assist in opening the liftgate.

BRIEF DESCRIPTION OF THE DRAWINGS

The presently preferred embodiment of the invention is disclosed in the following description and in the accompanying drawings, wherein.

DETAILED DESCRIPTION OF A PREFERRED EMBODIMENT

Figure 2:
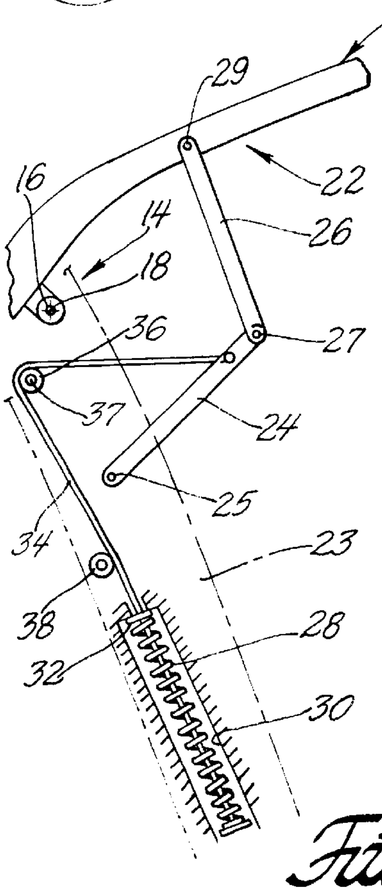
FIG. 2 is a side view of the vehicle of FIG. 1 showing details of the counterbalance system with the liftgate in the open position.
Figure 3:
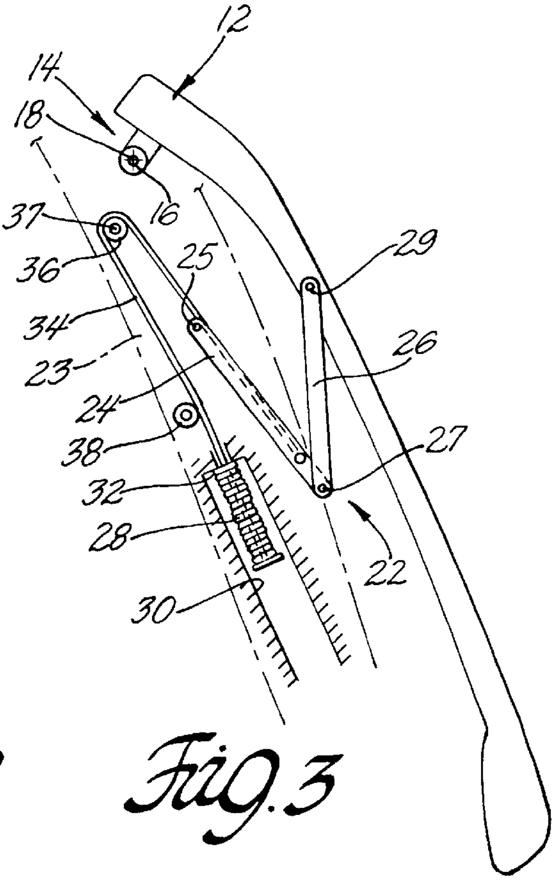
FIG. 3 is a side view of the vehicle of FIG. 1 showing details of the counterbalance system with the liftgate in the closed position.

Referring now to the drawings, vehicle 10 has a liftgate 12 that is attaches the aft end of the vehicle roof by two hinge assemblies. A portion of a typical right hand hinge assembly 14 is shown in FIGS. 2 and 3. Hinge assemblies 14 have hinge portion that are secured to a roof channel of the vehicle 10 and hinge portions that are secured to liftgate 12. The vehicle hinge portions are attached to the liftgate hinge portions by pivot pins 16 so that liftgate 12 pivots about a substantially horizontal hinge axis 18 at the aligned centerlines of pivot pins 16 from an open position shown in FIG. 2 to a closed position shown in FIG. 3. Liftgate 12 is generally permitted to pivot about 90° about the substantially horizontal axis 18 defined by pivot pins 16. However, the range of movement can be varied substantially from one model of vehicle to another.

Liftgate 12 is opened and closed manually or by a suitable power operating system and includes two identical counterbalance units 22 that are installed in the aft end of the vehicle body. Counterbalance units 22 are laterally spaced from each other and near the respective vertical body pillars 23 at the aft end of vehicle 10, commonly referred to as the D pillars, that define the width of the rear opening that is closed by liftgate 12. The typical counterbalance unit 22 is shown in greater detail in FIGS. 2 and 3.

Each counterbalance unit 22 comprises a first link 24 that is pivotally connected to a body portion of the vehicle by a first hinge pin 25 at or near the D pillar 23. A second link 26 is pivotally connected to the first link 24 adjacent one end by a second hinge pin 27 and pivotally connected to the vehicle liftgate 12 adjacent an opposite end by a third hinge pin 29. The first and second links 24 and 26 form an obtuse angle when liftgate 12 is open as shown in FIG. 2 and an acute angle when liftgate 12 is closed as shown in FIG. 3.

Each counterbalance unit 22 includes a coil shaped compression spring 28 that is disposed in a tubular housing 30 that is fixed the vehicle body, preferably at or near the D pillar 23. The upper end of the compression spring 28 abuts an upper annular flange 32 of the housing 30. Each counterbalance unit 22 includes a pulley having a flexible tension member 34 that is connected to the lower end of the coil shaped compression spring 28. Tension member 34 extends through the open center of the coil shaped compression spring 28 axially and out a concentric hole in an upper annular wall 32 of housing 30. Tension member 34 then continues upward and wraps around a roller 36 that is part of the pulley. Roller 36 revolves around an axis 37 that is substantially parallel to and spaced below the hinge axis 18 of the liftgate 12 defined by pivot pins 16. Tension member 34 is then attached to link 24 near the hinge pin 27 connecting links 24 and 26. The tension member 34 may be made of any flexible material and preferably is a steel cable.

Figure 1:
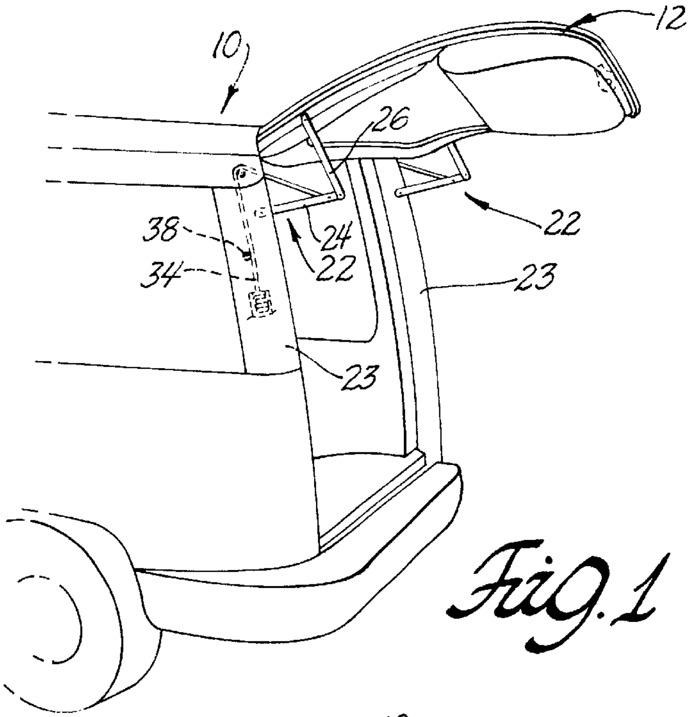
FIG. 1 is a perspective end view of a vehicle equipped with a liftgate and a counterbalance system in accordance with the invention.

The operation of the counterbalance system is as follows. When liftgate 12 is in the open position as shown in FIGS. 1 and 2, the coil shaped compression spring 28 is in an expanded state as shown in FIG. 2. Spring 28 is preferably slightly compressed when liftgate 12 is open to take up any lash in hinge assemblies 14 or the counterbalance units 22 due to manufacturing tolerances. The liftgate 12 is moved manually with the assistance of gravity to the closed position shown in FIG. 3. During closure the assistance of gravity initially increases and then decreases substantially as liftgate 12 approaches the closed position shown n FIG. 2 due to the changing moment arm. As liftgate 12 is moved manually to the closed position, tension member 34 pulls the lower end of compression spring 28 up compressing spring 28 and storing energy in the compressed spring 28 as shown in FIG. 3. This stored energy reaches a maximum when liftgate 12 is closed and assists in a subsequent opening the liftgate 12. When the closed liftgate 12 shown in FIG. 3 is opened, the compressed spring 28 expands and rotates link 24 counterclockwise about hinge pin 25 as viewed in FIG. 3 from the closed position shown in FIG. 3 to the open position shown in FIG. 2. Link 24 simultaneously rotates link 26 clockwise about the hinge pin 29 connecting link 26 to liftgate 12. This increases the angle between links 24 and 26 and the distance between the hinge pins 25 and 29 causing liftgate 12 to pivot counterclockwise about the hinge axis 18 from the closed position shown in FIG. 3 to the open position shown in FIG. 2.

The counterbalance system 22 may also be power operated by providing a drive roller 38 between the upper end of housing 30 and roller 36 that is driven by a suitable motor, such as an electric motor (not shown). In the case of power operation, the liftgate 12 is moved from open position of FIGS. 1 and 2 to the closed position of FIG. 3 by controlling the motor to rotate drive roller 38 counterclockwise as shown in FIG. 2 to drive tension member 34 up which compresses spring 28 and allows liftgate 12 to close under the influence of gravity. The liftgate 12 is then capable of being opened as described above or with the assistance of the motor driven roller 38 being driven clockwise.

With a counterbalance system, it is also preferably to locate drive roller 38 between roller 36 and compression spring 28 and to locate roller 36 so that the flexible tension member or cable 34 is forced against drive roller 38 for good driving engagement.

While the tension member 34 is illustrated as being attached to the first link 24 near the hinge pin 27, the tension member 34 may be connected to either link 24 or 26, the precise location of the attachment being determined by the physical characteristics of the vehicle and the lifting assistance that is desired.

In other words, while the present invention has been described as carried out in a specific embodiment thereof, it is not intended to be limited thereby but is intended to cover the invention broadly within the scope and spirit of the appended claims.

What is claimed is:

1. A counterbalance system for a vehicle liftgate that is pivotally attached to an aft end of a vehicle roof for pivotal movement about a hinge axis between a generally horizontal open posit ion and a closed generally vertical position, the counterbalance system storing energy during closure of the vehicle liftgate for assisting subsequent opening of the liftgate, the counterbalance system comprising:

a first link pivotally connected to a body portion of the vehicle by a pivot member, a second link pivotally connected to the first link adjacent one end and pivotally connected to the vehicle liftgate adjacent an opposite end, a compression spring abutting a body portion of the vehicle at one end, and a tension member connected to an opposite end of the spring at one end and to one of the first links and the second links at the opposite end whereby the spring stores energy when the liftgate is closed and releases the stored energy upon subsequent opening of the liftgate to assist in the subsequent opening of the liftgate, and a drive roller that engages the tension member to drive the tension member downwardly to store energy to assist in opening the liftgate.

2. A counterbalance system for a vehicle liftgate that is pivotally attached to an aft end of a vehicle roof for pivotal movement about a hinge axis between a generally horizontal open position and a closed generally vertical position, the counterbalance system storing energy during closure of the vehicle liftgate for assisting subsequent opening of the liftgate, the counterbalance system comprising:

a first link pivotally connected to a body portion of the vehicle by a pivot member, a second link pivotally connected to the first link adjacent one end and pivotally connected to the vehicle liftgate adjacent an opposite end, a compression spring abutting a body portion of the vehicle at one end, and a tension member connected to an opposite end of the spring at one end and to one of the first links and the second links at the opposite end whereby the spring stores energy when the liftgate is closed and releases the stored energy upon subsequent opening of the liftgate to assist in the subsequent opening of the liftgate wherein the tension member is flexible and wraps around a roller that is located between the hinge axis and the pivot member.

3. The vehicle as defined in claim 2 wherein the counterbalance system includes a pulley and the tension member is a cable that is part of the pulley.

4. The vehicle as defined in claim 3 wherein the pulley includes the roller that is located between the hinge axis and the pivot member.

5. The vehicle as defined in claim 4 wherein a drive roller engages the tension member to drive the tension member downwardly to store energy to assist in opening the liftgate, and the drive roller is below the roller of the pulley.

6. A vehicle having a counterbalance system for opening and closing a vehicle liftgate that is pivotally attached to an aft end of a vehicle roof for pivotal movement between an open position and a closed position about a hinge axis, the counterbalance system having at least one drive unit, comprising:

a first link pivotally connected to a body portion of the vehicle at one end, a second link pivotally connected to an opposite end of the first link at one end and pivotally connected to the vehicle liftgate at an opposite end of the second link, a roller located between the hinge axis and the first end of the first link, a compression spring disposed in a housing attached to the body portion of the vehicle, the compression spring having an end proximate the roller abutting an end wall of the housing, and a cable having a first end connected to an opposite remote end of the spring, the cable having a second end connected to one of the first links and the second links at the opposite end after the cable wraps around the roller whereby the spring stores energy when the liftgate is closed and releases the stored energy upon subsequent opening of the liftgate to assist in the subsequent opening of the liftgate.

7. The vehicle as defined in claim 6 wherein the cable is connected to the first link.

8. The vehicle as defined in claim 6 further including a drive roller that engages the cable to drive the cable downwardly to assist in opening the liftgate.

9. The vehicle as defined in claim 6 further including a drive roller that is located between the roller and the compression spring and that engages the cable to drive the cable downwardly to assist in opening the liftgate.

* * * * *